(12) United States Patent
Ishikawa

(10) Patent No.: US 8,682,154 B2
(45) Date of Patent: Mar. 25, 2014

(54) POSITION DETECTING UNIT, LENS UNIT AND CAMERA FURNISHED WITH SAME, LENS UNIT MANUFACTURING METHOD, AND POSITION DETECTING METHOD

(75) Inventor: Takafumi Ishikawa, Saitama (JP)

(73) Assignee: Tamron Co., Ltd., Saitama-shi, Saitama (JP)

( * ) Notice: Subject to any disclaimer, the term of this patent is extended or adjusted under 35 U.S.C. 154(b) by 49 days.

(21) Appl. No.: 13/557,074

(22) Filed: Jul. 24, 2012

(65) Prior Publication Data

US 2013/0034346 A1 Feb. 7, 2013

(30) Foreign Application Priority Data

Aug. 5, 2011 (JP) ................................. 2011-171601

(51) Int. Cl.
G03B 3/00 (2006.01)
G03B 13/18 (2006.01)
G03B 13/32 (2006.01)

(52) U.S. Cl.
USPC ........................................ 396/89; 324/207.24

(58) Field of Classification Search
USPC ............... 396/89; 324/207.21, 207.2, 207.22, 324/207.23, 207.24
See application file for complete search history.

(56) References Cited

U.S. PATENT DOCUMENTS

| 5,453,684 A * | 9/1995 | Nakayama | 324/207.12 |
| 7,729,603 B2 * | 6/2010 | Xu et al. | 396/89 |
| 2012/0146627 A1 * | 6/2012 | Masson et al. | 324/207.21 |
| 2013/0015845 A1 * | 1/2013 | Fox | 324/207.21 |

FOREIGN PATENT DOCUMENTS

JP 3173531 B2 6/2001

* cited by examiner

Primary Examiner — Clayton E Laballe
Assistant Examiner — Warren K Fenwick
(74) Attorney, Agent, or Firm — Westerman, Hattori, Daniels & Adrian, LLP

(57) ABSTRACT

Position detection unit detecting absolute positions without moving an object to be detected. The detection unit having a first sensor for outputting a monotone signal, that changes in response to displacement of an object to be detected; a second sensor for outputting two sinusoidal signals in response to displacement of the object to be detected; a first memory for storing a monotone signal relative to the position of the object to; a second memory for storing max and min values for each sinusoidal signal; and a position calculator for identifying the cycle of the sinusoidal signal in which the object to be detected is positioned based on the detected monotone signal and stored monotone signal data, and for calculating the position of the object to be detected within the identified cycle and obtaining an absolute position, based on the detected sinusoidal signal and the stored max/min data.

8 Claims, 3 Drawing Sheets

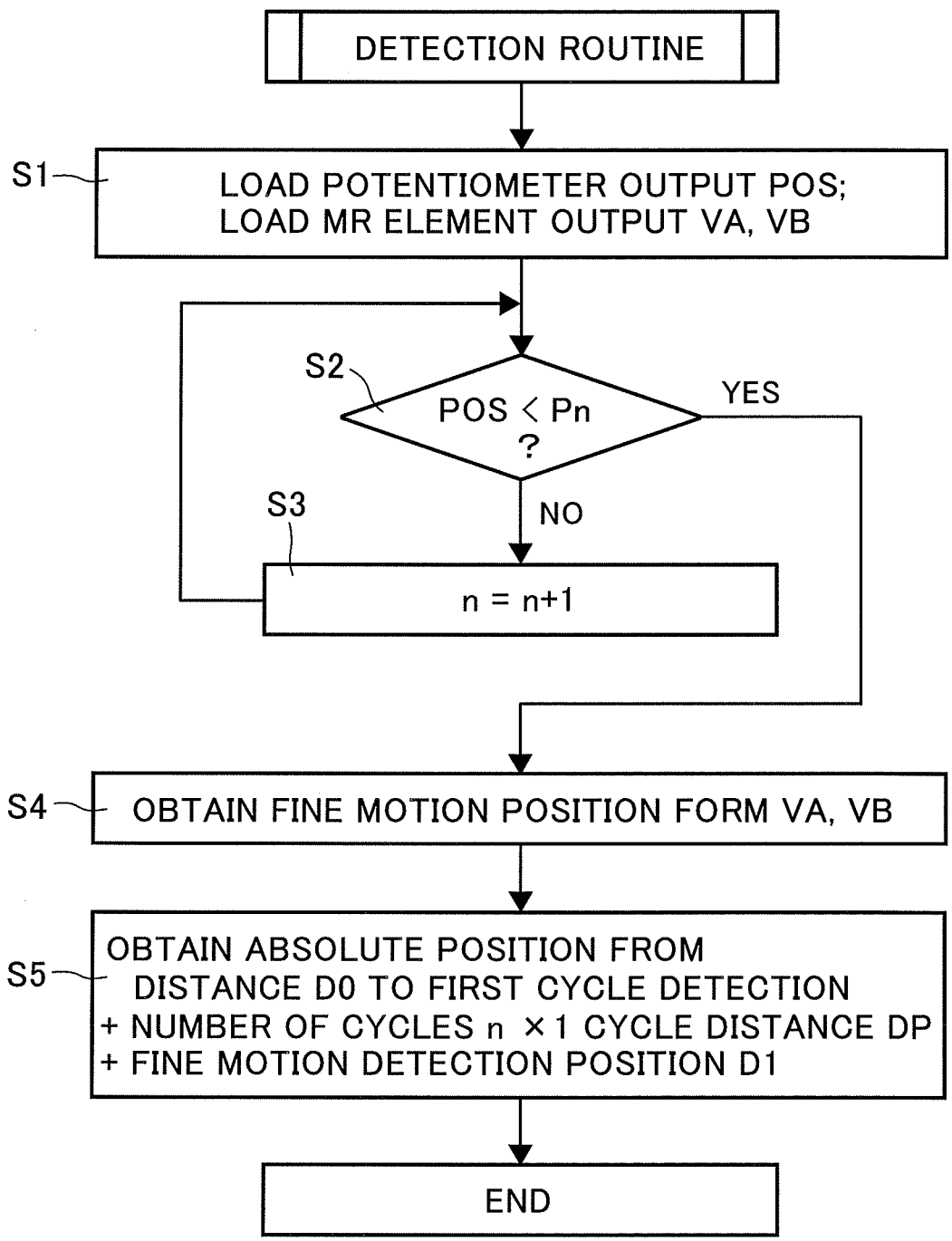

POSITION DETECTING UNIT, LENS UNIT AND CAMERA FURNISHED WITH SAME, LENS UNIT MANUFACTURING METHOD, AND POSITION DETECTING METHOD

CROSS-REFERENCE TO RELATED APPLICATIONS

The present patent application claims priority from Japanese Patent Application No. 2011-171601, filed Aug. 5, 2011, which is incorporated herein by reference in its entirety.

TECHNICAL FIELD

The present invention pertains to a position detecting unit, and more particularly to a position detecting unit for detecting the position of an object to be detected, a lens unit and camera furnished with same, a lens unit manufacturing method, and a position detection method.

BACKGROUND ART

Japanese Patent Publication 3173531 (Patent Document 1) sets forth a position detection method applied to position detection in video camera optics. In this position detection method, the position of the object under measurement is obtained by inputting a sine wave and a cosine wave and processing data. I.e., in this position detection method, an MR sensor (magnetic resistance element) is oriented to oppose an MR sensor magnet in which the S and N poles are alternately magnetized at a position detection magnetizing pitch such that sine and cosinusoidal signals are output from the MR sensor when the MR sensor is moved relative to the magnet. The position of the video camera optics is detected by computing these sinusoidal and cosinusoidal signals.

PRIOR ART REFERENCES

Patent References

Patent Document 1
Japanese Patent Publication 3173531

SUMMARY OF THE INVENTION

Problems the Invention Seeks to Resolve

In the position detection method set forth in Japanese Patent Publication 3173531, however, only the sinusoidal and cosinusoidal signals output from the MR sensor are used, leading to the problem that an absolute position for the object under measurement cannot be measured from only two signal values. The sinusoidal and cosinusoidal signals output from the MR sensor are signals which repeat at a cycle equal to the magnetization pitch of the MR sensor magnet as the MR sensor is displaced. Therefore it is not possible to identified from only the value of a measured sinusoidal signal or the value of a measured cosinusoidal signal the cycle in which an object under measurement is positioned.

Therefore detection of an absolute position using the position detection method set forth in Japanese Patent Publication 3173531 requires first moving the object under measurement to a mechanically movable end, then moving the object under measurement to the position to be position detected, counting the number of cycles of change in the sine wave or the cosine wave during that interval. In other words, detection of an absolute position using the position detection method set forth in Japanese Patent Publication 3173531 requires first moving the object under measurement at the start of detection to a reference position at which its absolute position is already known, then moving the object under measurement to the position at which the position is to be detected.

Therefore when the position detection method set forth in Japanese Patent Publication 3173531 is used to detect the position of a focusing lens or zoom lens in an optics lens unit, the focusing lens or zoom lens should be first forcibly moved to a moveable endpoint upon startup of the lens unit. When the lens is moved in this manner at startup, the problem arises that lens unit or camera startup time is prolonged. Also when the lens is first moved in this way to a movable end, the position of the focusing lens or the zoom lens, which had been set prior to startup, is reset so that the user should once again reset the position of the lens, leading to the problem of poor lens unit usability.

The present invention therefore has the object of providing a position detection unit, a lens unit and camera furnished with same, and a lens unit manufacturing method and position detection method with which absolute position can be detected without moving the object under measurement to a predetermined reference position at startup.

Means for Resolving the Problem

In order to resolve the above-described problems, the present invention is a position detection unit for detecting the position of an object to be detected, comprising: a first sensor for outputting a monotone signal, monotonically increasing or decreasing within a predetermined detection range in response to displacement of the object to be detected; a second sensor for outputting two sinusoidal signals of mutually offset phases, varying sinusoidally in response to displacement of the object to be detected; a first memory section for storing monotone signal data, which is the value of the monotone signal relative to the position of the object to be detected; a second memory section for storing max/min data, which is the maximum value and minimum value in each cycle of each sinusoidal signal; and a position computing section; wherein the position computing section identifies the cycle of the sinusoidal signal within which the object to be detected is positioned, based on the monotone signal detected by the first sensor and the monotone signal data stored in the first memory section, and wherein the position computing section calculates the position of the object to be detected within the identified cycle based on the two sinusoidal signals detected by the second sensor and on the max/min data stored in the second memory section, to obtain an absolute position.

In the present invention thus constituted, the first sensor outputs a monotone signal and the second sensor outputs two sinusoidal signals of mutually offset phases in response to displacement of the object to be detected. The monotone signal data is stored in the first memory section, and the min/max data is stored in the second memory section. Based on the monotone signal detected by the first sensor and the monotone signal data stored in the first memory section, the position computing section indentifies the cycle of the sinusoidally changing sinusoidal signal within which the object to be detected is positioned. Furthermore the position calculating section obtains an absolute position based on the two sinusoidal signals detected by the second sensor, and on the min/max data stored in the second memory section.

In the present invention thus constituted, the cycle of the sinusoidal signal is identified based on the monotone signal detected by the first sensor and on monotone signal data stored in the first memory section, therefore an absolute position can be detected without moving the object to be detected to a predetermined reference position.

The present invention further comprises a position detection magnet in which the S poles and N poles are alternately magnetized during a predetermined interval, and wherein the second sensor is disposed so that its position relative to the position detecting magnet varies with displacement of the object to be detected, and the sinusoidal signal is output in response to displacement of the object to be detected.

In the present invention thus constituted, the two sinusoidal signals, sinusoidally varying in response to displacement of an object to be detected and mutually offset in phase, can be produced simply and accurately.

In the present invention the phases of the two sinusoidal signals are preferably mutually offset by approximately 90°.

In the present invention thus constituted, the position of the object to be detected within the identified cycle can be accurately calculated based on the two sinusoidal signals.

In the present invention the monotone signal data is preferably obtained at the position where one of the sinusoidal signals output from the second sensor intersects the inverted waveform of the other sinusoidal signal, and is stored in the first memory section.

In the present invention thus constituted, the position of the object to be detected in the identified cycle can be calculated using a simple formula based on the two sinusoidal signals.

The present invention is a lens unit for image capture, comprising: a lens barrel; an image capturing lens disposed within the lens barrel so as to be movable in the direction of the optical axis; and the position detection unit of the present invention, wherein the position detection unit detects the position of the image capturing lens in the direction of the optical axis.

The present invention is a camera for image capture, comprising: a camera main body; and the lens unit of the present invention.

In addition, the present invention is a method for manufacturing a camera, comprising steps of: a step for providing a position detection unit, including: a first sensor for outputting a monotone signal, monotonically increasing or decreasing in response to displacement in the optical axis direction of an image capturing lens within a predetermined movable range; a second sensor for outputting two sinusoidal signals of mutually offset phases, varying sinusoidally in response to displacement of the image capturing lens; a first memory section for storing monotone signal data, which is the value of the monotone signal relative to the position of the image capturing lens; a second memory section for storing max/min data, which is the maximum value and minimum value in each cycle of each sinusoidal signal; and a position computing section wherein the position computing section identifies the cycle of the sinusoidal signal within which the image capturing lens is positioned, based on the monotone signal detected by the first sensor and the monotone signal data stored in the first memory section, and wherein the position computing section calculates the position of the image capturing lens within the identified cycle based on the two sinusoidal signals detected by the second sensor and on the max/min data stored in the second memory section, to obtain an absolute position; a step for moving the image capturing lens within the predetermined movable range to store the monotone signal data in the first memory section, and to store the max/min data in the second memory section; and a step for performing flangeback adjustment or viewing angle adjustment based on the position detected by the position detection unit.

Furthermore, the present invention is a position detection method for detecting the position of an object to be detected, comprising steps of: a step for loading a monotone signal, monotonically increasing or decreasing in response to displacement of the object to be detected within a predetermined detection range; a step for loading two sinusoidal signals of mutually offset phases, varying sinusoidally in response to displacement of the object to be detected; a step for identifying the cycle of the sinusoidal signal within which the object to be detected is positioned, based on the loaded monotone signal, and on monotone signal data, wherein the monotone signal data is the value of the monotone signal relative to the position of the object to be detected and has been pre-detected and stored; and a step for calculating the position of an object to be detected within the identified cycle and obtaining an absolute position, based on the loaded sinusoidal signal and on max/min data, wherein the max/min data is the maximum value and minimum value in each cycle of each sinusoidal signal and has been pre-detected and stored.

Effect of the Invention

Using the position detection unit, the lens unit and camera furnished with same, and the lens unit manufacturing method and position detection method of the present invention, it is possible to detect an absolute position without moving the object to be detected to a predetermined reference position at the time of startup.

BRIEF DESCRIPTION OF FIGURES

FIG. 4: A flow chart showing the procedure for detecting the absolute position of a zoom adjustment lens based on the output of each sensor.

EMBODIMENTS OF THE INVENTION

Next, referring to the attached figures, an embodiment of the present invention is explained.

Figure 1:
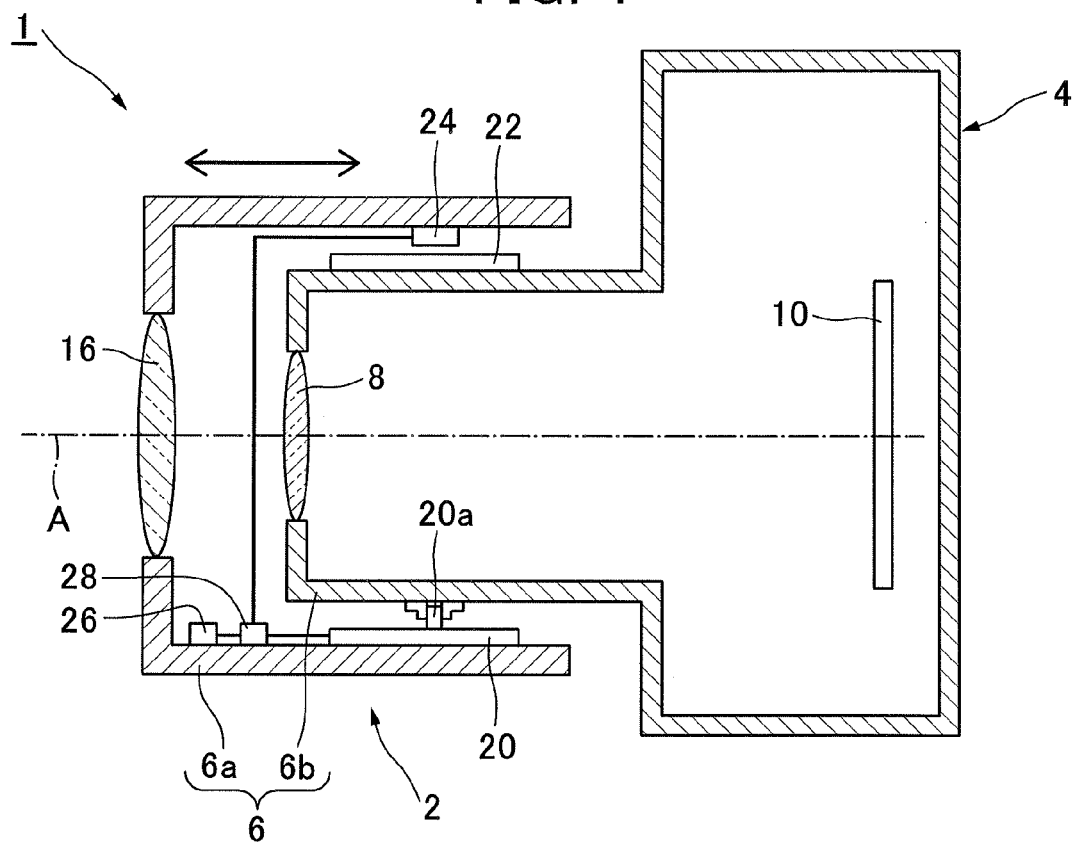
FIG. 1: A summary cross section of a camera according to an embodiment of the present invention.

First, referring to FIGS. 1 through 4, we explain a camera according to an embodiment of the present invention. FIG. 1 is a summary cross section of a camera according to an embodiment of the present invention.

As shown in FIG. 1, the camera 1 of this embodiment of the present invention has a lens unit 2 and a camera main unit 4. The lens unit 2 has a lens barrel 6, multiple image capturing lenses 8 arrayed within the lens barrel; a zoom adjustment lens 16; a linear actuator (not shown) for moving the zoom adjustment lens 16 along the optical axis; and a position detection unit for detecting the position of the zoom adjustment lens 16.

The camera 1 of the first embodiment of the present invention is constituted to be able to form an image at a desired viewing angle on the image capture element 10 while moving the zoom adjustment lens 16 along the optical axis by means of the linear actuator (not shown). The position of the moved zoom adjustment lens 16 is detected by the position detection unit. Note that in the present embodiment the zoom adjustment lens 16 is constituted by a single lens, but the zoom adjustment lens may also be a group of multiple lenses. In the present Specification, "zoom adjustment lens" includes single lens and multiple lens groups for the purpose of changing viewing angles.

In the present embodiment the position of the zoom adjustment lens 16 moved to a desired position is detected by the position detection unit, but the position detection of the present invention can also be used to detect the position of a focus adjustment lens.

The lens unit 2 is attached to the camera body 4 so as to focus incident light on the image capture element 10.

The approximately cylindrical lens barrel 6 comprises an outer lens barrel 6a and an inner lens barrel 6b, and the zoom adjustment lens 16 is attached to the outer lens barrel 6a. The outer lens barrel 6a is arranged to be movable in a straight line along optical axis A relative to the inner lens barrel 6b. There are also multiple image capturing lenses 8 in the inner lens barrel 6b (only one is diagrammed), and focus adjustment can be accomplished by moving a portion of the focus adjustment lenses therein along the optical axis A.

Next, referring to FIGS. 1 through 4, we discuss the position detection unit.

Figure 2:
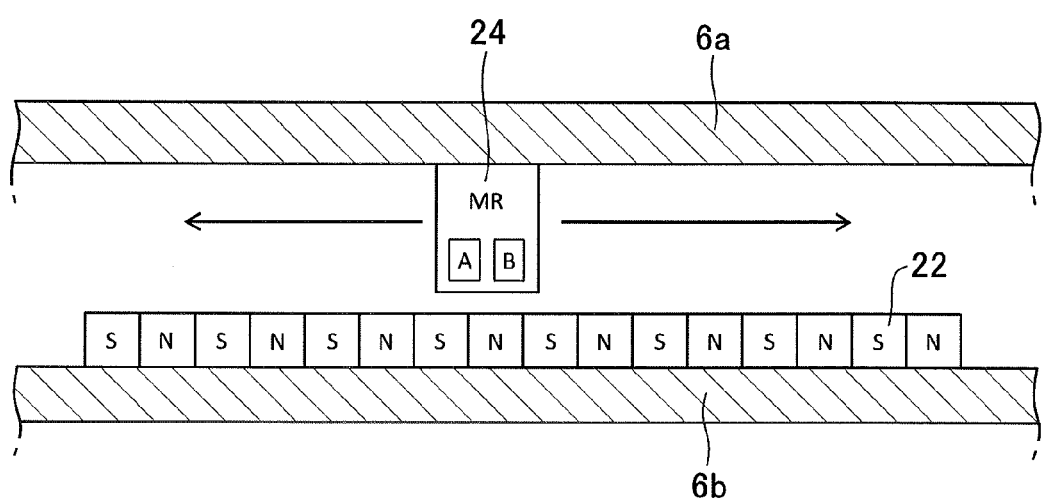
FIG. 2: A diagram schematically depicting the position detection magnet and MR element provided in the position detection unit.
Figure 3:
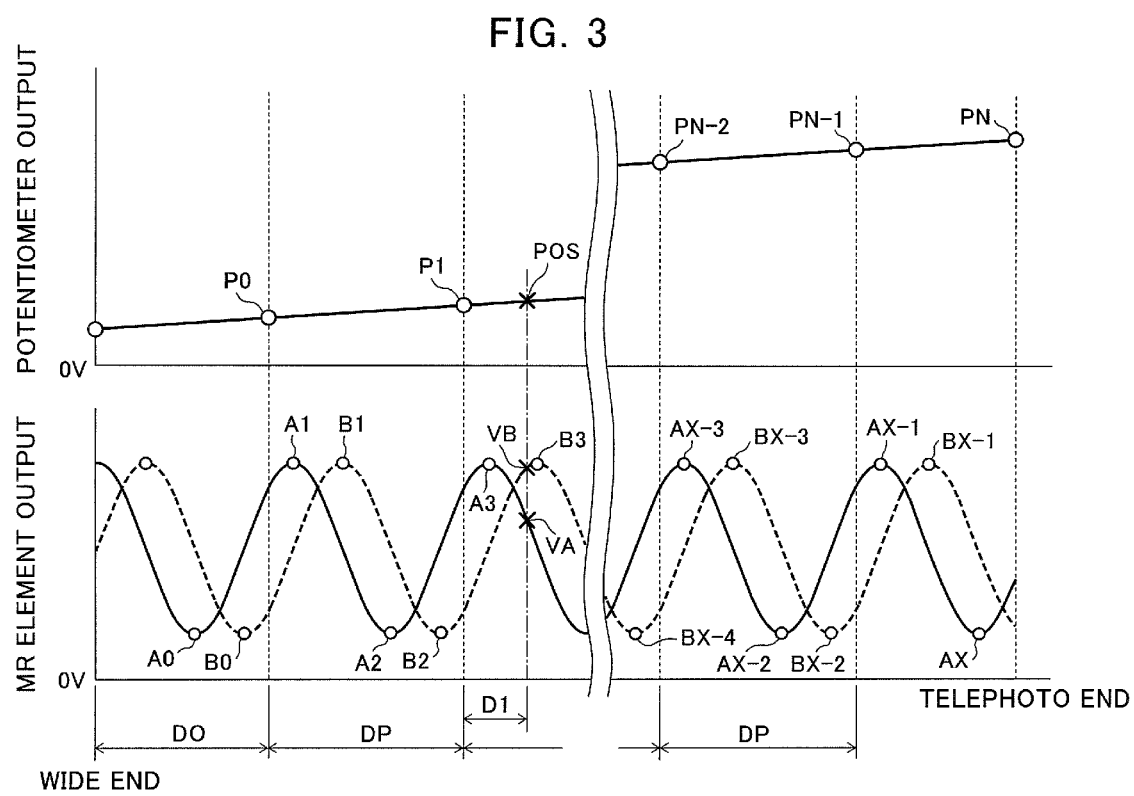
FIG. 3: A diagram showing the output signals from a potentiometer and a MR element.

FIG. 2 is a diagram schematically showing the position detection magnet 22 and MR element 24 provided in the position detection unit. FIG. 3 is a diagram showing the output signals from the potentiometer 20 and the MR element 24. FIG. 4 is a flow chart showing the procedure for detecting the absolute position of the zoom adjustment lens 16 based on the output of each sensor.

As shown in FIG. 1, the position detection unit has: a potentiometer 20 serving as first sensor, a position detection magnet 22 serving as second sensor, an MR element 24 (magnetic resistance element) disposed in opposition thereto, a memory 26 made up of first and second memory sections, and a microprocessor 28 serving as a position computing section for determining the position of the zoom adjustment lens 16 (lens barrel 6), which is the object to be detected, based on the detection values from each sensor.

The potentiometer 20 is a linear potentiometer disposed on the inside of the outer lens barrel 6a. A slider 20a on the potentiometer 20 engages the inner lens barrel 6b, and is constituted so that the position of the slider 20a changes when the outer lens barrel 6a is displaced along the optical axis A relative to the inner lens barrel 6b. The output signal from the potentiometer 20 changes linearly in proportion to positional changes in the slider 20a. I.e., the output signal from the potentiometer 20 is a monotonic signal which increases or decreases monotonically relative to displacement of the outer lens barrel 6a.

As shown in FIG. 2, the position detection magnet 22 is formed in an elongated rectangle wherein the S and N poles are alternately magnetized at a predetermined interval; it is attached to the outside perimeter of the inner lens barrel 6b so as to follow the optical axis A (parallel to the optical axis). In the present embodiment, the position detection magnet 22 is approximately 9 mm in total length, and is magnetized so that the length of one cycle formed of a set of S and N poles is approximately 460 μm.

The MR element 24 is disposed on the inside of the outer lens barrel 6a so as to oppose the position detection magnet 22. The MR element 24 is constituted so that its output voltage changes due to the magnetism acting on it from the position detection magnet 22, and the output voltage varies sinusoidally when the outer lens barrel 6a is displaced relative to the inner lens barrel 6b.

The MR element 24 is constituted to output an A phase and a B phase signal; the A phase and B phase signals are respectively sinusoidally changing sinusoidal signals, and the signals from each phase are at all times offset in phase by approximately 90°.

The upper portion of FIG. 3 graphs the output signal from the potentiometer 20 relative to the position of the zoom adjustment lens 16; the lower portion of FIG. 3 graphs the output signal from the MR element 24 in the lower half; of the output signals, the values for the signals stored in the memory 26 are circled.

When adjusting the camera 1 for the first time, the outer lens barrel 6a (zoom adjustment lens 16) is first moved from one mechanically movable end (the wide end) to the other mechanically movable end (the telephoto end). Concurrently, the output signals from the potentiometer 20 and the MR element 24 change as shown in FIG. 3. As shown in the upper half of FIG. 3, the output signal of the potentiometer 20 increases monotonically in a linear manner with the movement of the zoom adjustment lens 16 from the wide end to the telephoto end. As shown in the lower half of FIG. 3, on the other hand, the output signal from the MR element 24 changes in a sinusoidal form in both the A and B phases, and the A and B phases are always offset by about 90°. The period of the output sinusoidal signal matches the magnetization pitch (the magnetization length of the pair of S and N poles) of the position detection magnet 22.

The value of the points circled in FIG. 3 at the time of initial adjustment is stored in memory 26. I.e., the respective maximum values and minimum values for the phase A and phase B signals output from the MR element 24 are stored as max/min data in the memory 26. With respect to the output signal from the potentiometer 20, values thereof are stored as monotonic signal data in the memory 26 for positions at which the slopes of the MR element 24 phase A and phase B signals are positive and the inverted waveform values of the phase A and phase B signals are equal (the positions shown by dotted lines in FIG. 3). Note that monotonic signal data can be taken at any desired point marking one cycle of the sinusoidal phase A and phase B signals, but as is described below, fine motion positions can be computed by a simple calculation by acquiring the monotone signal data at positions where one sinusoidal signal intersects the inverted waveform of the other sinusoidal signal.

The output value of the potentiometer 20 at the wide end is also stored in the memory 26. Furthermore, the distance D0 in FIG. 3, which is to say the length from the wide end until the start of the first cycle, is calculated based on the values of the phase A signal and phase B signal at the wide end, and this distance D0 is also stored in the memory 26. The calculation of distance based on the phase A and phase B signals is discussed below.

In the present embodiment non-volatile memory is used as the memory 26, and various stored values continue to be stored after power is turned off. The part of the memory 26 in which the output signal of the potentiometer 20 is stored forms a first memory portion in which the monotone signal value is stored, and the part in which the output signal of the MR element 24 is stored forms a second memory portion in which the max and min values for each period of the sinusoidal signal are stored. Note that in the present embodiment the one interval, delimited by the dotted line in FIG. 3, is computed as the one cycle of the sinusoidal signal output from the MR element 24.

Next, referring to FIG. 4, we explain a procedure for calculating absolute positions in the microprocessor 28 based on the output value of each sensor.

First, at the time of the above-described initial adjustment prior to shipment from the factory, the values of each point shown by a circle in FIG. 3 are stored in the memory 26. I.e., the values of each point of the output of the potentiometer 20 are stored as monotone signal data P0, P1, . . . PN; the values of each point of the phase A output of the MR element 24 are stored as max/min data A0, A1, . . . AX; and the values of each point of the phase B output thereof are stored as max/min data B0, B1, . . . BX−1. As an example, we discuss here the calculation of the position of the point depicted by an X in FIG. 3.

First, in step S1 of FIG. 4, output POS from the potentiometer 20, and phase A output VA and phase B output VB from the MR element 24 are loaded into the microprocessor 28. Next, in step S2, the output POS from the potentiometer 20 is compared to P0 stored in memory 26. When POS is smaller than P0, the system advances to step S4, and when POS is equal to or greater than P0, the system advances to step S3. In the example shown in FIG. 3 the system advances to step S3, since POS is equal to or greater than P0.

In step S3 the number of cycles n is incremented by 1, and the system returns to step S2. Next, in step S2, since the number of cycles n is incremented by 1, the output POS from the potentiometer 20 is compared to P1 stored in memory 26. In the example shown in FIG. 3, POS is equal to or greater than P1, so n is incremented by 1 in step S3, and in the following step S2, the output POS and P2 (not shown in FIG. 3) are compared. Since output POS is smaller than P2, the system advances to step S4.

In step S4 the fine motion position, i.e. the accurate distance D1 from P1 to POS in FIG. 3, is calculated based on the phase A output VA and phase B output VB from the MR element 24. First, the value of the phase A output VA is normalized using the values A2 and A3, which are proximate values to the VA stored in the memory 26. I.e., the phase A output VA is normalized by the following formula (1) and converted to VAN.

$$VAN = \frac{2(VA - VAzero)}{VApp} \tag{1}$$

Where, $$VAzero = \frac{A2 + A3}{2}$$

$$VApp = A3 - A2$$

In FIG. 3, the phase A output waveform from the MR element 24 is depicted as an ideal sine wave, but in actuality amplitude varies in each part of the phase A output waveform, and the origin point of the waveform is offset. In the present embodiment, the effects of errors in such waveforms are suppressed by normalization. I.e., the effects of offsetting the sine waveform are corrected by subtracting VA0 from the phase A output VA, and errors in the amplitude of the sine waveform are corrected by dividing by VApp.

Similarly, the value of the phase B output VB is normalized using the values B2 and B3, which are proximate values to the VB stored in the memory 26. I.e., the phase B output VB is normalized by the following formula (2) and converted to VBN, such that the effect of errors is reduced.

$$VBN = \frac{2(VB - VBzero)}{VBpp} \tag{2}$$

Where, $$VBzero = \frac{B2 + B3}{2}$$

$$VBpp = B3 - B2$$

Next, the distance D1 is calculated by dividing one cycle into 4 cases based on the calculated values for VAN and VBN.

I.e., when VAN>−VBN, and VAN>VBN, distance D1 is calculated by Formula (3).

$$D1 = \frac{DP}{4\sqrt{2}} VBN + \frac{DP}{8} \tag{3}$$

Here DP is the distance of one cycle, and this distance DP is a known value set by the magnetization pitch of the position detection magnet 22.

Similarly, fine motion distance D1 is calculated as follows: when VBN>VAN and VBN>−VAN, $$D1 = \frac{DP}{4\sqrt{2}} VAN + \frac{3DP}{8} \tag{4}$$

when −VAN>VBN and −VAN>−VBN, $$D1 = -\frac{DP}{4\sqrt{2}} VBN + \frac{5DP}{8} \tag{5}$$

and when −VBN>−VAN and −VBN>VAN, $$D1 = \frac{DP}{4\sqrt{2}} VAN + \frac{7DP}{8} \tag{6}$$

Thus the fine motion distance D1, which is the distance from the start of the cycle to which the point POS belongs, up to the point POS, can be accurately calculated based on the output signal of the MR element 24, which changes sinusoidally.

Next, in step S5, the absolute position of the zoom adjustment lens 16 is calculated using the fine motion distance D1 calculated in step S4. I.e., in step S5, the absolute position of the zoom adjustment lens 16 is calculated using Formula (7).

(absolute position)=distance $D0$+1 cycle distance $DP$×number of cycles $n$+fine motion distance $D1$ (7)

In Formula (7), the distance D0 from the wide end to the start of the first cycle is pre-calculated at time of initial adjustment, and is the distance stored in the memory 26. Note that the distance D0 can be obtained by the same calculation as used in step S4, based on the phase A output VA and phase B output VB at the wide end, and on the single cycle distance DP. Also, in the example shown in FIG. 3, the number of cycles contained in the interval up to point POS is 1 (in the FIG. 4 flow chart, the system moves from step S2 to step S4 when n=1), therefore the number of cycles n=1.

The absolute position thus calculated has a far higher accuracy than the absolute position calculated based on the output signal of the potentiometer 20 alone. For example, assuming a distance of 10 mm from the wide end to the telephoto end and a potentiometer 20 amplitude in this interval of 2V, an error of approximately 50 μm in the absolute position calculated based on the output signal of the potentiometer 20 alone would be introduced if an error of 10 mV occurred in the output voltage of the potentiometer 20 due to tolerances, signal noise, and the like in the potentiometer 20. In contrast, the sinusoidal signal output from the MR element 24 repeats fluctuations of a cycle far shorter than the total stroke of the zoom adjustment lens 16, so that by detecting the number of cycles in the fluctuation and the fine motion distance under a single cycle, the error introduced into the absolute position can be suppressed by approximately a factor of 10.

Furthermore, in the position detection unit of the present embodiment it is possible to identify the cycle in which the sinusoidal signal to be detected is positioned, based on the output signal from the potentiometer 20 and the voltage values (P0, P1, . . . PN) pre-stored in the memory 26. Therefore after initial adjustment prior to shipment from the factory, the absolute position of the zoom adjustment lens 16 can be directly detected with high precision without moving the zoom adjustment lens 16 to the wide end or the telephoto end at startup.

Next we explain the processing implemented to prevent mis-detections of the number of cycles n.

As described above, in the position detection unit of the present embodiment, an identification is made of the cycle of the sinusoidal signal in which the position to be detected is present, based on the output value of the potentiometer 20. Therefore when the output POS of the potentiometer 20 at the position to be detected is proximate to the cycle border of the output signal from the MR element 24, there is a risk that the cycle to which the POS belongs will be mis-detected due to a minute error contained in the POS. For this reason, the following mis-detection prevention processing is carried out in the position detection unit of the present embodiment.

First, when the detected POS is proximate to the monotone signal data (P0, P1, . . . PN) stored in the memory 26, for example when $$P1 < POS < P1 + \frac{P2 - P1}{4}$$

and the fine motion distance D1 calculated from the output signal of the MR element 24 is $$\frac{3DP}{4} < D1 < DP,$$

the value of POS indicates that the POS is positioned at the beginning of the 2nd cycle, and cycle number n=1 is obtained from this POS value. However the fine motion distance D1 value obtained from the MR element 24 indicates that the position to be detected is positioned at the end of the one cycle, so a judgment is made that the cycle number n=1 obtained from the POS value is a mis-detection, and the cycle number n is corrected to 0.

Similarly, if $$P0 + \frac{3(P1 - P0)}{4} < POS < P1,$$

and the fine motion distance D1 calculated from the output signal of the MR element 24 is $$0 < D1 < \frac{DP}{4},$$

then the POS value indicates that the POS is positioned at the end of the first cycle, and the cycle number n obtained from this POS value is 0. However the fine motion distance D1 value obtained from the MR element 24 indicates that the position to be detected is positioned at the beginning of the one cycle, so a judgment is made that the cycle number n=0 obtained from the POS value is a mis-detection, and the cycle number n is corrected to 1.

By carrying out such mis-detection prevention processing, mis-detections of cycle count caused by tolerance errors in the output of the potentiometer 20 can be prevented.

Next we discuss a method for manufacturing the lens unit 2 according to the present embodiment of the invention.

First, when a user turns off the power switch (not shown) of the camera 1, the microprocessor 28 built into the camera 1 executes the flow chart shown in FIG. 4. I.e., the position detection unit built into the camera 1 detects the position of the zoom adjustment lens 16. First, the microprocessor 28 identifies the cycle of the sinusoidal sinusoidal signal output from the MR element 24 in which the zoom adjustment lens 16 is positioned, based on the output signal from the potentiometer 20 and on monotone signal data pre-stored in the memory 26. Moreover, the microprocessor 28 calculates the fine motion position D1 of the zoom adjustment lens 16 within the identified cycle, and obtains the absolute position of the zoom adjustment lens 16 based on the phase A and phase B signals output from the MR element 24, and on the max/min data pre-stored in the memory 26. The obtained position of the zoom adjustment lens 16 is used to control the camera 1.

In the position detection unit of the present embodiment, the cycle in which the zoom adjustment lens 16 is positioned is identified based on the output signal from the potentiometer 20, therefore after the camera 1 is started, the precise absolute position of the zoom adjustment lens 16 can be detected from the beginning without moving the zoom adjustment lens 16 to a mechanically movable end.

Also, when a user operates the zoom adjustment button (not shown) on the camera 1, an actuator (not shown) built into the camera 1 drives the outer lens barrel 6a, moving the zoom adjustment lens 16. When the zoom adjustment lens 16 is moved, the position detection unit again detects the position of the zoom adjustment lens 16. Note that in the present embodiment the position detection unit uses the output signal of the potentiometer 20 to detect an absolute position each time the zoom adjustment lens 16 is moved, but as a variant example, once the absolute position is detected, the absolute position can continue to be detected without use of the output signal from the potentiometer 20. In such cases, the output signal from the MR element 24 after detection of the absolute position would be monitored, and the cycle in which the zoom adjustment lens 16 is positioned would be identified by counting sinusoidal signal cycles moving from the original detected absolute position.

Next we discuss a method for manufacturing the camera 1 according to the present embodiment of the invention.

An outer lens barrel 6a, inner lens barrel 6b, zoom adjustment lens 16, and position detection unit are first prepared and a lens unit 2 assembled. Furthermore, a camera main unit 4 is prepared, and the camera main unit 4 is assembled with the lens unit 2 to assemble the camera 1. Next, the zoom adjustment lens 16, which is one of the image capturing lenses, is moved together with the outer lens barrel 6a, and monotone signal data and max/min data are stored in the memory 26.

Next, the viewing angle is adjusted using the position detection unit. The focus-adjusting image capturing lenses 8 inside the lens unit 2 is moved to the infinity position. In this state, an image is formed on the image capture element 10, and the zoom adjustment lens 16 is moved to a position at which the formed image is at the designed viewing angle of the wide end of the zoom lens. The absolute position of the moved zoom adjustment lens 16 is detected by the position detection unit, and the detected absolute position is stored in the memory 26. The camera 1 is constituted such that when the wide end is designated by the zoom adjustment button (not shown), the zoom adjustment lens 16 is moved to the absolute position stored in the memory 26.

The position detection unit of the present embodiment can also be used to detect the position of the focus adjustment lens. By using the position detection unit to detect the absolute position of the zoom adjustment lens and/or the focus adjustment lens, it is also possible to adjust camera flange-back.

Using the position detection unit of the present embodiment of the invention, the cycle of the sinusoidal signal is identified based on the monotone signal detected by the potentiometer 20 and on monotone signal data stored in the memory 26, therefore an absolute position can be detected without moving the zoom adjustment lens 16, which is the object to be detected, to a mechanically movable end serving as a predetermined reference position.

Also, using the position detection unit of the present embodiment, the MR element 24 and the position detection magnet 22 are used so that a sinusoidal signal is generated by displacement of the zoom adjustment lens 16, therefore two sinusoidal signals of mutually offset phases can be simply and accurately generated.

In addition, using the position detection unit of the present embodiment, the phases of the two sinusoidal signals are mutually offset by approximately 90°, therefore the position of the zoom adjustment lens 16 in the identified cycle can be accurately calculated based on the two sinusoidal signals.

Also, using the position detection of the present embodiment, the monotone signal data is acquired at the position where the sinusoidal signal (the phase A signal) output from the MR element 24 intersects the inverted waveform of the other sinusoidal signal (the phase B signal), therefore the position of the zoom adjustment lens 16 within the identified cycle can be simply calculated from Formulas (1) through (6).

We have explained above a preferred embodiment of the present invention, but various changes may be made to the above-described embodiments.

In particular, the position detection unit of the present invention was applied to a digital camera in the above-described embodiment, but the present invention may also be applied to an image-capturing interchangeable lens unit, and to any desired film camera, video camera, or the like. Furthermore, in the above-described embodiment the position detection of the present invention was applied to detection of the absolute position of a zoom adjustment lens, but the present invention may also be applied to detecting the position of a focus lens or to any desired position detection. Also, in the above-described present embodiment an MR element was used as the sensor for outputting a sinusoidal signal, but in addition to MR elements, it is also acceptable to use any desired sensor, such as an GMR sensor, AMR sensor, or optical sensor.

Furthermore, in the above-described embodiment the fine motion position D1 was calculated using Formulas (1) through (6) based on the phase A and phase B signals, but the fine motion position D1 can also be calculated by any other computation method based on the two sinusoidal signals. Moreover, in the above-described embodiment the zoom adjustment lens was moved prior to shipment of the camera from the factory, and monotone signal data and max/min data was stored in memory, but the present invention may also be constituted so that the acquisition and storage of each data point is automatically performed when the user first starts the camera, and thereafter all data is held in memory.

EXPLANATION OF REFERENCE NUMERALS

1: Camera according an embodiment of the present invention
2: Lens unit
4: Camera main unit
6: Lens barrel
6a: Outer lens barrel
6b: Inner lens barrel
8: Imaging lens
10: Image capturing element
16: Zoom adjustment lens (object to be detected)
20: Potentiometer (first sensor)
20a: Slider
22: Position detection magnet (second sensor)
24: MR element (second sensor)
26: Memory (first and second memory sections)
28: Microprocessor (position computing section)

The invention claimed is:

1. A position detection unit for detecting the position of an object to be detected, comprising:
   a first sensor for outputting a monotone signal, monotonically increasing or decreasing within a predetermined detection range in response to displacement of the object to be detected;
   a second sensor for outputting two sinusoidal signals of mutually offset phases, varying sinusoidally in response to displacement of the object to be detected;
   a first memory section for storing monotone signal data, which is the value of the monotone signal relative to the position of the object to be detected;
   a second memory section for storing max/min data, which is the maximum value and minimum value in each cycle of each sinusoidal signal; and
   a position computing section;
   wherein the position computing section identifies the cycle of the sinusoidal signal within which the object to be detected is positioned, based on the monotone signal detected by the first sensor and the monotone signal data stored in the first memory section, and wherein the position computing section calculates the position of the object to be detected within the identified cycle based on the two sinusoidal signals detected by the second sensor and on the max/min data stored in the second memory section, to obtain an absolute position.

2. The position detection unit according to claim 1, further comprising a position detection magnet in which the S poles and N poles are alternately magnetized during a predetermined interval, and wherein the second sensor is disposed so that its position relative to the position detecting magnet varies with displacement of the object to be detected, and the sinusoidal signal is output in response to displacement of the object to be detected.

3. The position detection unit according to claim 1, wherein the phases of the two sinusoidal signals are mutually offset by approximately 90°.

4. The position detection unit according to claim 3, wherein the monotone signal data is obtained at the position where one of the sinusoidal signals output from the second sensor intersects the inverted waveform of the other sinusoidal signal, and is stored in the first memory section.

5. A lens unit for image capture, comprising:
a lens barrel;
an image capturing lens disposed within the lens barrel so as to be movable in the direction of the optical axis; and
the position detection unit according to claim 1,
wherein the position detection unit detects the position of the image capturing lens in the direction of the optical axis.

6. A camera for image capture, comprising:
a camera main body; and
the lens unit according to claim 5.

7. A method for manufacturing a camera, comprising steps of:
a step for providing a position detection unit, including:
a first sensor for outputting a monotone signal, monotonically increasing or decreasing in response to displacement in the optical axis direction of an image capturing lens within a predetermined movable range;
a second sensor for outputting two sinusoidal signals of mutually offset phases, varying sinusoidally in response to displacement of the image capturing lens;
a first memory section for storing monotone signal data, which is the value of the monotone signal relative to the position of the image capturing lens;
a second memory section for storing max/min data, which is the maximum value and minimum value in each cycle of each sinusoidal signal; and
a position computing section wherein the position computing section identifies the cycle of the sinusoidal signal within which the image capturing lens is positioned, based on the monotone signal detected by the first sensor and the monotone signal data stored in the first memory section, and wherein the position computing section calculates the position of the image capturing lens within the identified cycle based on the two sinusoidal signals detected by the second sensor and on the max/min data stored in the second memory section, to obtain an absolute position;
a step for moving the image capturing lens within the predetermined movable range to store the monotone signal data in the first memory section, and to store the max/min data in the second memory section; and
a step for performing flangeback adjustment or viewing angle adjustment based on the position detected by the position detection unit.

8. A position detection method for detecting the position of an object to be detected, comprising steps of:
a step for loading a monotone signal, monotonically increasing or decreasing in response to displacement of the object to be detected within a predetermined detection range;
a step for loading two sinusoidal signals of mutually offset phases, varying sinusoidally in response to displacement of the object to be detected;
a step for identifying the cycle of the sinusoidal signal within which the object to be detected is positioned, based on the loaded monotone signal, and on monotone signal data, wherein the monotone signal data is the value of the monotone signal relative to the position of the object to be detected and has been pre-detected and stored; and
a step for calculating the position of an object to be detected within the identified cycle and obtaining an absolute position, based on the loaded sinusoidal signal and on max/min data, wherein the max/min data is the maximum value and minimum value in each cycle of each sinusoidal signal and has been pre-detected and stored.

* * * * *